Aug. 27, 1929. E. C. MILLER 1,726,113
MACHINE FOR MAKING ANNULAR PIECES OF CANDY
Filed Dec. 15, 1927 3 Sheets-Sheet 1
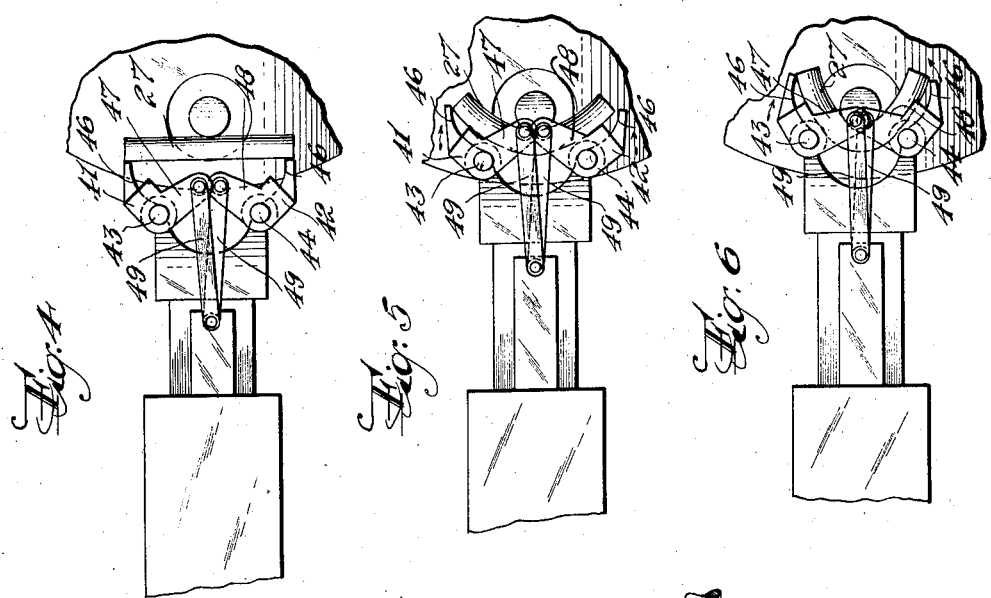

Aug. 27, 1929.  E. C. MILLER  1,726,113
MACHINE FOR MAKING ANNULAR PIECES OF CANDY
Filed Dec. 15, 1927  3 Sheets-Sheet 2
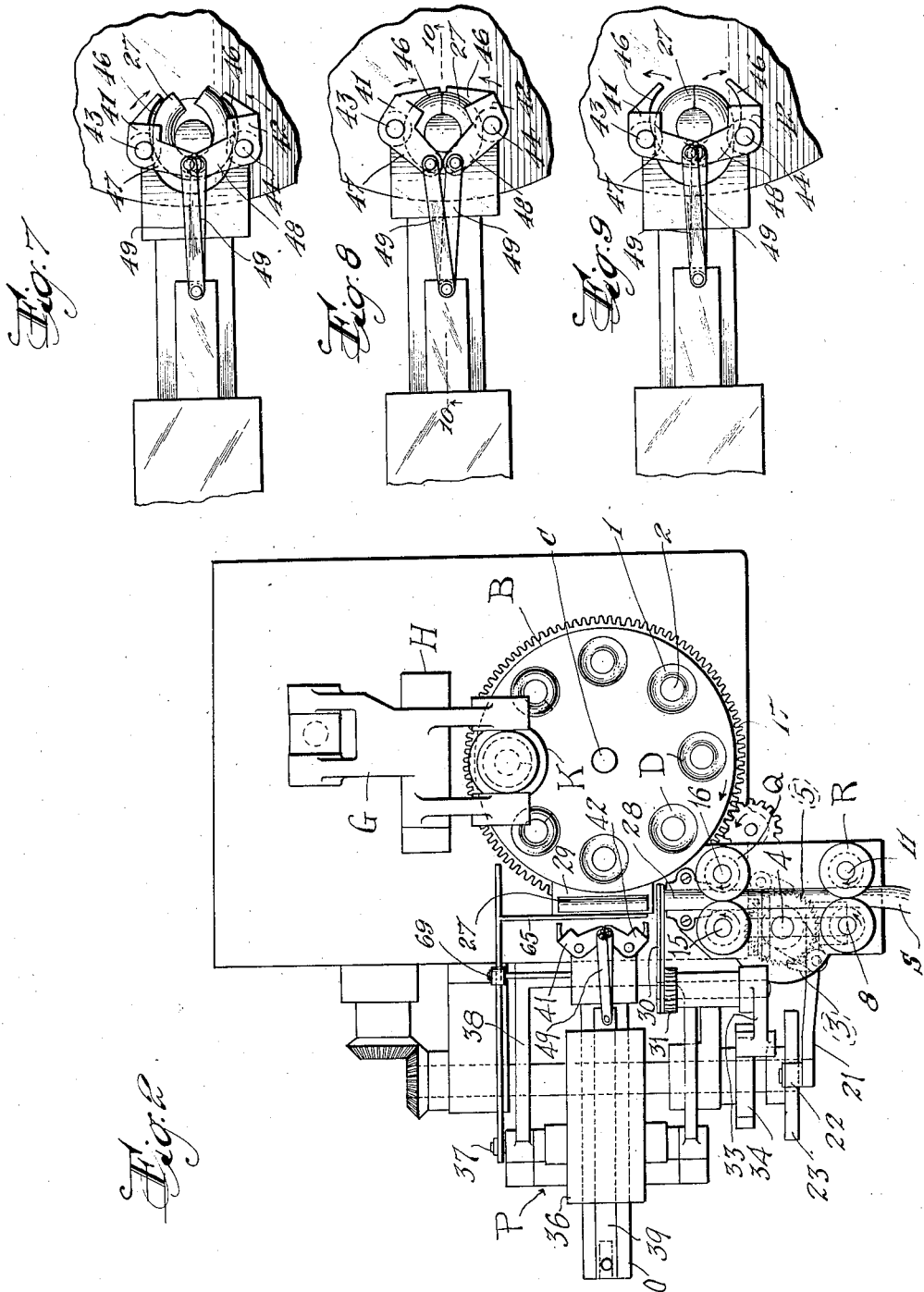
INVENTOR
Ezeck C. Miller,
BY
Everett H. Cook.
ATTORNEYS

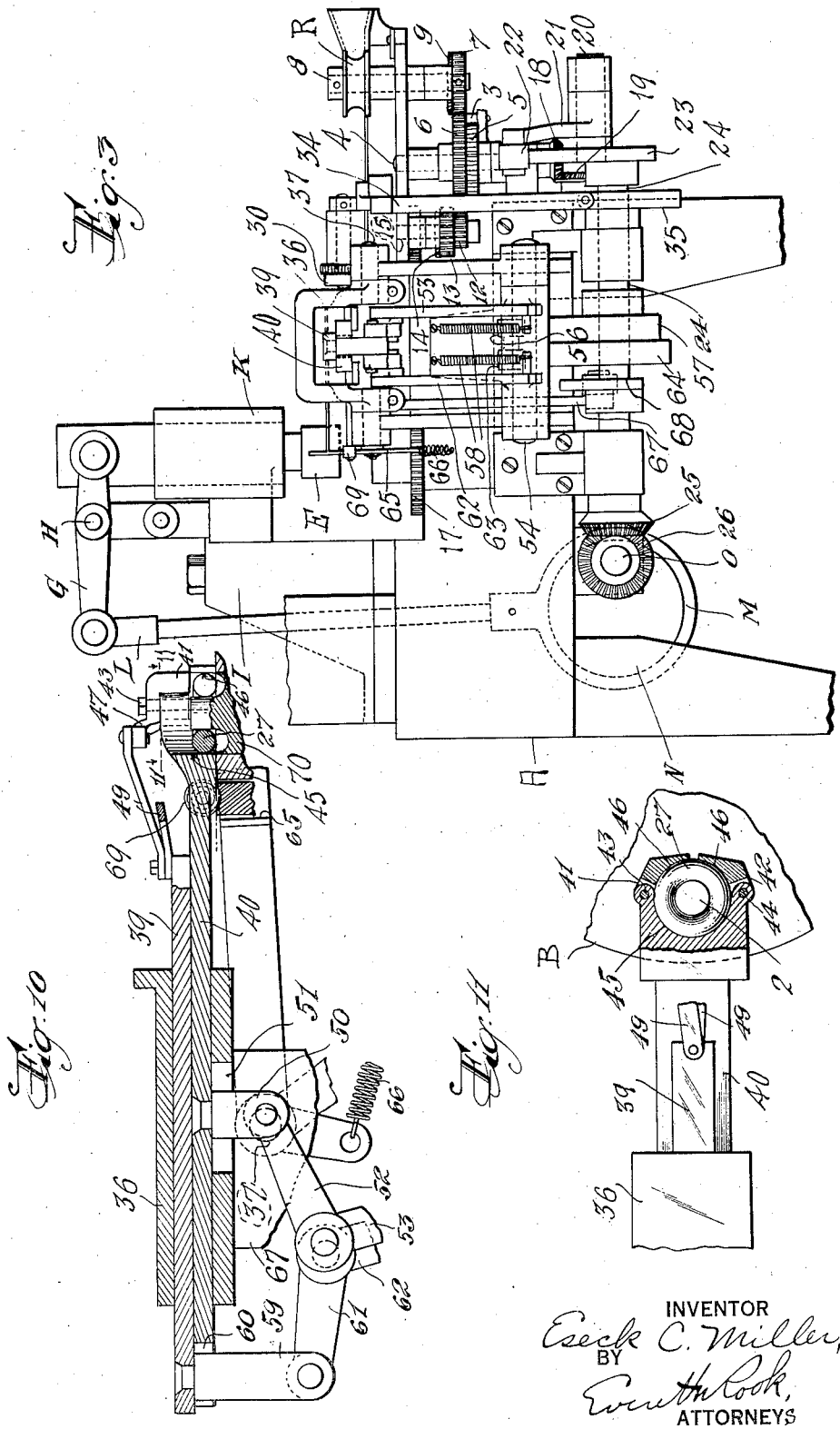

Patented Aug. 27, 1929.

1,726,113

UNITED STATES PATENT OFFICE.

ESECK C. MILLER, OF NEWARK, NEW JERSEY.

MACHINE FOR MAKING ANNULAR PIECES OF CANDY.

Application filed December 15, 1927. Serial No. 240,166.

This invention relates in general to candy-making machines, and more particularly to a machine for making annular or ring-like pieces of candy. The invention is especially intended for use in making candy from material which during manufacture is tacky, taffy-like or pasty in consistency and hardens after a period of time. It has been found to be practically impossible to punch annular pieces of candy from such material because the material strings and adheres to the edges of the dies, so that not only are the dies short-lived, but the pieces of candy have rough edges.
One object of my invention is to provide a machine of the character described embodying novel and improved features of construction whereby annular pieces of candy may be made by a pressure moulding operation, that is, by being compressed between cooperating shaped die members.

Another object is to provide such a machine including a die having an annular cavity therein and a post projecting coaxially with said cavity, and novel and improved means for curling a piece of the material from which the candy is to be made around said post in said cavity, a second die member cooperating with the first-mentioned die member to compress the material between the die members and tightly about said post so as to form an annular piece of candy.

A further object is to provide novel and improved means for curling the piece of material about the die post and depositing the same in the die cavity.

Other objects are to provide a machine of the character described including a plurality of die cavities with which cooperates a single common die ram, said die cavities being arranged in a rotatable table which moves in a step by step manner past the said mechanism for depositing the piece of material in the die cavity, said material-depositing mechanism being co-ordinated with the movement of the said rotating table so as to deposit a piece of material in each of a plurality of the die members as the latter move past the depositing mechanism, and to obtain other advantages and results as will be brought out by the following description.

In the accompanying drawings I have shown the now preferred form of my invention, but it should be understood that this is primarily for the purpose of illustrating the principles of the invention and that the details of construction of the machine may be modified and changed without departing from the spirit or scope of the invention.

Referring to said drawings, in which corresponding and like parts are designated throughout the several views by the same reference characters, Figure 1 is a side elevation of a machine embodying my invention;

Figure 2 is a top plan view thereof;

Figure 3 is an end elevation, viewing the same from line 3—3 of Figure 1;

Figures 4–8, inclusive, are fragmentary plan views of the curling fingers and parts of the operating mechanism therefor illustrated in the successive positions assumed during the curling of the material about the post;

Figure 9 is a similar view showing the first step in the retracting movement of the fingers after the material has been deposited in the die;

Figure 10 is a longitudinal sectional view through the curling fingers and operating mechanism therefor, and Figure 11 is a horizontal sectional view, taken on the line 11—11 of Figure 10.

Specifically describing the illustrated embodiment of the invention, the reference character A designates the frame of the machine upon the top of which is mounted a table B to rotate about an axis C. This table carries a plurality of die members D arranged in annular relation concentric with the table and each including a cavity 1 and a central post 2 projecting upwardly from the center of the die member and merging into the sides of the cavity. This table is preferably rotated with a step by step motion, and any suitable means may be utilized for this purpose, for example that to be hereinafter described.

A die member E is provided to cooperate successively with all of the die members D to compress the material between said die members, said member E having a central opening to receive said post 2. Said die member is connected to a ram F which is reciprocated by a lever G pivotally mounted intermediate its ends as at H upon a standard I which also supports a guide K for the ram. The lever G is connected by a link L to an eccentric strap M actuated by an eccentric N mounted on a drive shaft O. The driving mechanism is so constructed that the ram F is forced downwardly to cause cooperation of the die member E with one of the die members D upon each step of rotation of the table B.

Mounted upon the frame A is a mechanism P for depositing into the die members D the material from which the candy is to be made. This depositing mechanism includes two pairs of feed rollers Q and R, the peripheries of each pair of which cooperate to form a circular passage between the rollers which shape the material S of which the candy is to be made into a rope-like form. These rollers are driven with a step by step motion from a pawl 3 mounted on a shaft 4 and cooperating with a ratchet 5 loose upon said shaft and fast connected to a gear 6 which meshes with a gear 7 on the shaft 8 of one of the feed rollers R. Another gear 9 on the shaft 11 of the other feed roller R meshes with the gear 7. Similarly, the gear 6 meshes with gears 12, 13 and 14 on the shafts 15 and 16 of other feed rollers Q. The shaft 16 carries another gear which meshes with a gear 17 on the periphery of the table B. The pawl 3 is moved alternately in opposite directions through a bevel gear 18 on the shaft 4 meshing with another bevel gear 19 on a countershaft 20, which shaft has connected thereto a crank arm 21 having a follower roller 22 in engagement with a cam 23 mounted on a second countershaft 24 having a bevel gear 25 meshing with a similar bevel gear 26 on the drive shaft O. With this construction, a piece 27 of material of the length necessary to fill one of the die members D is projected through a guide tube 28 upon each step of movement of the feed rollers and the table B. This piece 27 of material is deposited upon an extension 29 at one side of the table B, as clearly shown in Figure 1 of the drawings, and in proper relation to the mechanism for curling the material about the post 2 of the die member. The piece 27 is cut off from the main body of the material by shears 30 which are operated through pinions 31 and 32 and a crank arm 33 connected to an eccentric strap 34 on an eccentric 35 on the countershaft 24.

The curling mechanism includes a tubular guide 36 mounted to oscillate in vertical planes about a pivot 37 on an extension 38 of the frame A. Mounted within said tubular support are two slides 39 and 40 in superposed and relatively slidable relation. The slide 40 has pivotally connected to one end thereof a pair of curling fingers 41 and 42 which are pivotally movable about the respective pivot bolts 43 and 44. The end of the slide 40 is formed with a substantially semi-circular curved surface 45 of the same diameter as the die members D, and the fingers 41 and 42 have complementary arcuate surfaces 46 of the same diameter to form with the surface 45 a substantially complete circle. The fingers 41 and 42 have respective crank arms 47 and 48 which are connected by links 49 to the slide 39, so that upon relative movement of the two slides 39 and 40 the surfaces 46 of the fingers 41 and 42 are moved toward and from each other.

For producing such relative movement of the slides 39 and 40, the slide 40 has a pivot stud 50 projecting through a slot 51 in the bottom of the guide 36 and connected by a link 52 to one arm 53 of a bell crank lever pivotally mounted on the frame extension 38, as at 54. The other arm 55 of said bell crank lever carries a follower roller 56 held in engagement with a cam 57 by a tension spring 58. The slide 39 has a pivot stud 59 projecting through a slot 60 in the slide 40 and connected by a link 61 to a second bell crank lever 62 identical with the first-mentioned bell crank and pivotally mounted upon the same pivot pin 54 and having a follower roller 63 engaging a cam 64 on the countershaft 24.

In their normal and retracted positions, the fingers 41 and 42 are disposed at the opposite side of the piece 27 of candy material from the die member D, as shown in Figures 2 and 4. The cams 57 and 64 are so shaped and so related to the movement of the table B and the feed of the piece 27 of the material, that upon feed of each piece of material the cams cause simultaneous movement of the two slides 39 and 40 to push the piece 27 toward the respective die member. This action continues until the piece of material is pushed into contact with the post 2 of the die member, whereupon the cams move the slides 39 and 40 relatively to each other to actuate the curved surfaces 46 of the fingers toward each other from opposite sides of the post 2. This action continues until the piece of material has been completely curled around the post 2 and deposited into the cavity 1, whereupon the cams 57 and 64 retract the fingers from each other and from the die member and the table B is actuated to actuate said die member D toward the die member E.

Preferably a stop device 65 is provided for preventing the piece 27 from falling off the table as it is cut by the shears 30, this device including an L-shaped strip of material having one arm disposed between the fingers 41 and 42 and the piece of material 27, and the other arm pivotally connected to the pivot 37 of the guide 36. This device 65 is normally influenced by a tension spring 66 upwardly above the surface of the table B. It is therefore necessary to force the stop device out of the path of the fingers 41 and 42 as they move toward the table B. Accordingly, the guide 36 has an arm 67 extending downwardly and engaging a cam 68 on the shaft 24, the cam being so related to the other parts of the machine that when the fingers 41 and 42 are retracted to their normal position, as shown in Figure 2, the guide 36 is tilted to raise the fingers above the device 65. Upon movement of the slides 39 and 40 toward the table B, the cam 68 tilts the guide 36 downwardly, and the slide 40 is provided with a roller 69 to engage the top of the device 65 and roll along the same, whereby said device is pushed out of the path of the curling fingers.

Any suitable means may be provided for removing the candy from the die members, but as shown each die member includes a bottom plate 70 vertically movable so as to normally be located below the surface of the table B and capable of projecting thereabove. The plates 70 have connected thereto rods 71 which are connected by a cross-bar 72 slidable in guide slots 73. After the material has been compressed into the die members by the ram F, the cross bars 72 ride upwardly on a fixed cam 74 on the frame A, which action forces the die plate 70 upwardly, as shown in Figure 1, so that the candy piece may be manually removed from the die plate or knocked therefrom by an oscillating arm or other suitable means.

Obviously a plurality of the material depositing mechanisms may be utilized to increase the speed of production. Also the details of construction of the machine may be widely modified or changed by those skilled in the art without departing from the spirit or scope of the invention.

Having thus described the invention, what I claim is:

1. A machine of the character described, comprising a die member having an annular cavity and a post projecting therefrom, means for feeding pasty material to be operated upon in the form of a plastic rod, means for curling said plastic rod around said post and into said cavity in annular form and means for compressing said material in said die member in the direction of the axis thereof.

2. A machine of the character described, comprising a die member having an annular cavity and a post projecting therefrom, means for feeding pasty material to be operated upon in the form of a plastic rod, a pair of curling fingers movable together toward and from said post and movable relatively to each other to partially surround said post, and means for actuating said fingers to curl said plastic rod around said post and into said cavity in annular form.

3. A machine of the character described, comprising a die member having an annular cavity and a post projecting therefrom, means for feeding pasty material to be operated upon in the form of a plastic rod, a pair of curling fingers movable together toward and from said post and movable relatively to each other to partially surround said post, a pair of relatively slidable members, means for pivotally mounting said fingers on one of said members, an operative connection between said fingers and the other of said members whereby relative movement of said members causes relative pivotal movement of said fingers, and means for moving said members together toward and from said post and relatively to cause said fingers to respectively partially surround and move away from said post.

4. A machine of the character described, comprising a die member having an annular cavity and a post projecting therefrom, means for feeding pasty material to be operated upon in the form of a plastic rod, a pair of curling fingers movable together toward and from said post and movable relatively to each other to partially surround said post, a pair of relatively slidable members, means for pivotally mounting said fingers on one of said members, an operative connection between said fingers and the other of said members whereby relative movement of said members causes relative pivotal movement of said fingers, a cam for actuating each of said members, an operative connection between said cams and the respective members, said cams being movable and having corresponding portions so as to move said members together and also having other corresponding portions to cause relative movement of said members, and means for synchronously rotating said cams.

5. A machine of the character described, comprising a die member having an annular cavity and a post projecting therefrom, means for feeding pasty material to be operated upon in the form of a plastic rod, means for curling said plastic rod around said post and into said cavity in annular form including a member movable toward and from said cavity and having a portion of the same shape and size as a portion of the periphery of said cavity, a pair of curling fingers mounted upon said member to move toward and from each other and having surfaces complemental to each other and said portion of said member to form an opening of the same size and shape as said cavity, and means for moving said member from and toward said cavity and simultaneously respectively separate and move said fingers toward each other, whereby said plastic rod is curled around said post and into said cavity in annular form.

6. A machine of the character described, comprising a die member having an annular cavity and a post projecting therefrom, means for feeding pasty material to be operated upon in the form of a plastic rod, means for curling said plastic rod around said post and into said cavity in annular form, and a second die member cooperating with the first-mentioned die member to press said plastic material therebetween and into close contact with the walls of said cavity and said post.

7. A machine of the character described, comprising a die member having an annular cavity and a post projecting centrally therefrom, means for feeding material in proximity to said die member in the form of a plastic rod, means for curling said plastic rod into annular form and depositing it in said annular cavity, and a second die member movable into and out of the first-mentioned die member and formed with an opening to receive said post to compress said material between said die members into an annular piece.

8. A machine of the character described comprising a plurality of cooperating relatively movable die members to form a closed chamber between them when in a certain relation to each other, a post cooperating with said members within said chamber to form an annular cavity, means for relatively moving said die members successively out of and into said certain relation to permit insertion of material to be operated upon into said cavity and removal of the finished article therefrom and to compress material within said cavity respectively, and means for feeding pasty material in the form of a plastic rod and curling it around said post into said cavity while said die members are out of said certain relation.

9. A machine of the character described comprising a die member having a die opening with a movable end portion, a cooperating die member to enter said opening and compress material therein, a post associated with one of said members to cooperate with said die opening to form an annular cavity, means for feeding pasty material in the form of a rod and curling it around said post into said cavity, and means for relatively moving said die members to successively compress said material into an annular piece and eject said piece from said opening.

10. A machine of the character described comprising a die member having a flat surface and a die cavity therein, with a post projecting therefrom above said surface, means for feeding a rod-like piece of material into a position at one side of said cavity in the plane of said surface, means for pushing said piece of material from said feeding position against and curling said piece around said post into annular form, and a cooperating die member to compress said annular piece of material in said die cavity.

ESECK C. MILLER.